Patented Oct. 8, 1940

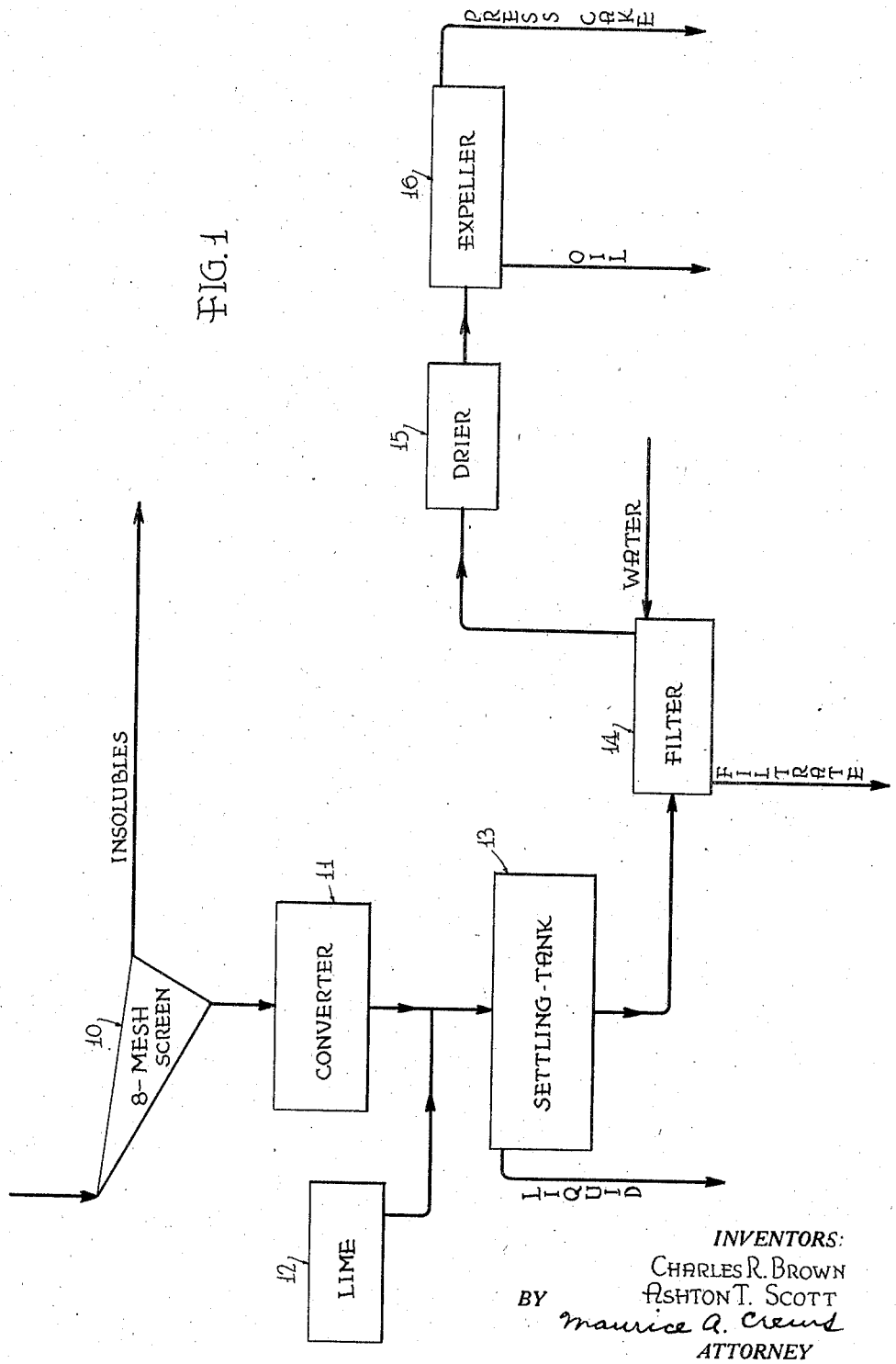

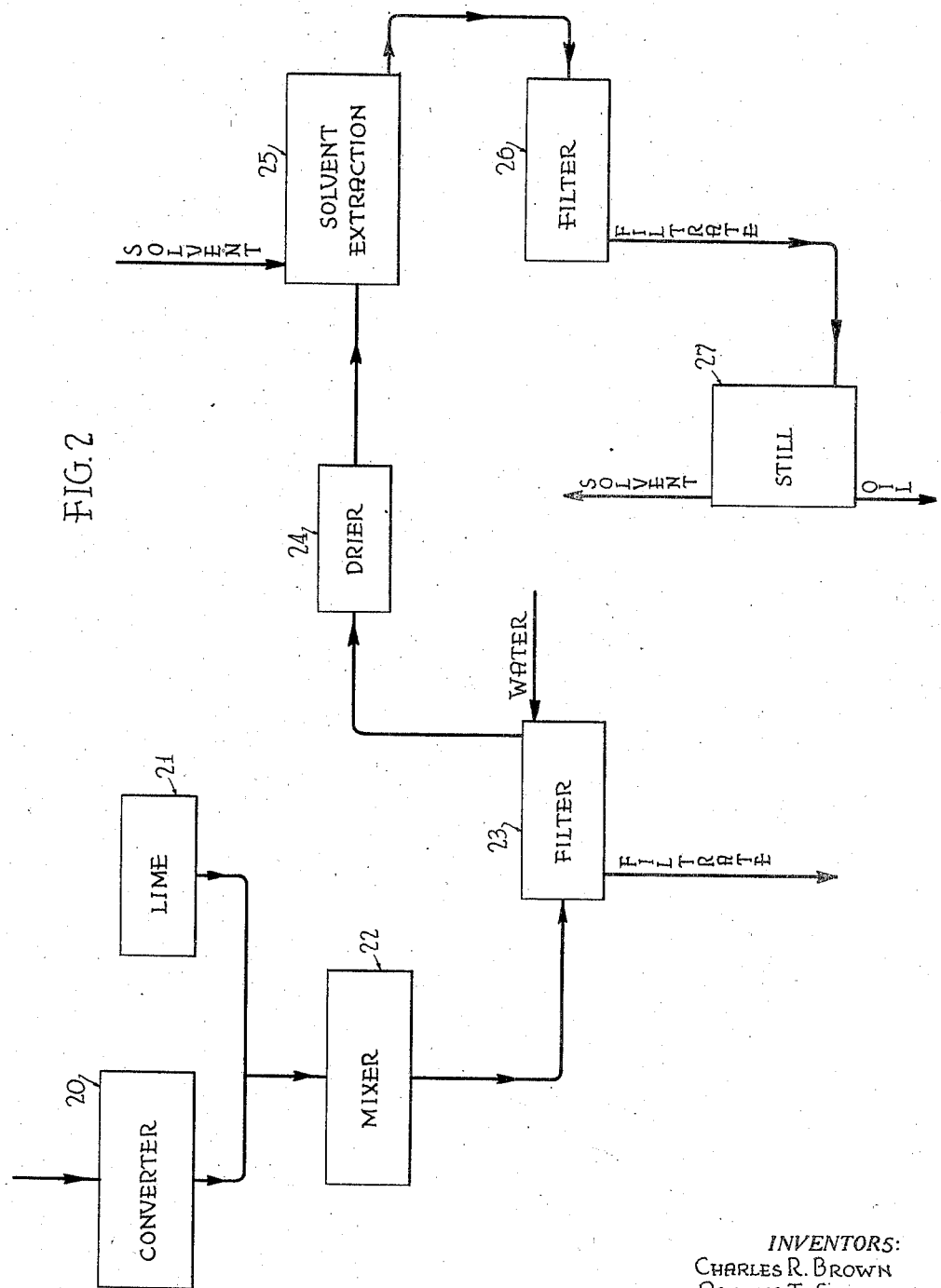

2,216,905

UNITED STATES PATENT OFFICE 2,216,905

TREATMENT OF DISTILLERY SLOP

Charles R. Brown, Champaign, Ill., and Ashton T. Scott, Ardmore, Pa., assignors to The Sharples Corporation, a corporation of Delaware Application August 12, 1938, Serial No. 224,453

10 Claims. (Cl. 260—412.5)

The present invention relates to the treatment of distillery slop. This application is a continuation in part of the application of Charles R. Brown, Serial No. 192,383, filed February 24, 1938, for Method of treating distillery slop, and of the application of Charles R. Brown, Serial No. 155,036, filed July 22, 1937, for Treatment of distillery slop. Certain features described in the present application are also described in our co-pending application Serial No. 224,452, filed of even date herewith.

In the application of Charles R. Brown, Serial No. 192,383, a process is described in which distillery slop is heated to a temperature in excess of 240° F. for the purpose of effecting coagulation of albuminous impurities and conditioning that slop for a subsequent step of separating coagulated and agglomerated impurities by filtration. In the practice of the process of that application, the filtrate may be disposed of in various ways.

The step of heating under pressure not only converts the slop to a condition in which the insoluble constituents may be separated from a clear liquid effluent by filtration, centrifugation or gravity settling, but it renders possible the recovery of a filter cake or equivalent fraction containing insoluble constituents from which vegetable oils may be economically obtained in cases in which the original slop contains such oils.

While the process of application Serial No. 192,383 renders possible the separation of the slop into insoluble constituents and a clear liquid effluent, respectively, by filtration or otherwise, the step of filtering the slop may be speeded up, and the interval of time between repeated operations of cleaning the filter surface may be prolonged, in cases in which the process is modified by preliminarily liming the slop before passing it to the filter. Such a procedure is described in application Serial No. 155,036, referred to above.

In the processes of both of the above mentioned applications, the slop is subjected to a step of heating under pressure to effect coagulation of albuminous constituents and render said slop separable into liquid and insoluble fractions respectively, by filtration, gravity settling, centrifugation or screening through silk. In those processes, the step of pressure conversion by heat may be accomplished by heating the slop to a temperature substantially in excess of its atmospheric boiling point for a period of time dependent upon the characteristics and source of the slop. Such heating effects a conversion of the impurities of the slop which would otherwise cause cloggage of the filter cloth into a condition in which such cloggage does not occur. In the performance of the process, the slop is subjected to a temperature substantially in excess of its boiling point, the pressure being maintained sufficiently high to keep the slop in liquid phase. The temperature employed to effect conversion will ordinarily be substantially in excess of 273° F. in cases in which the heating is continued only for a period of twenty minutes or less. This converting step may be accomplished, on a typical Bourbon whiskey distillery slop, for example, by maintaining the slop for about one-half hour at a temperature of about 287° F., or for about twenty minutes at a temperature of about 297° F., or for about ten minutes at a temperature of about 307° F. In the treatment of typical distillery slop obtained from corn, it has been found that the desired conversion can be attained by a heating step of one hour at a temperature of 259° F., or of one and one-half hours at a temperature of 250° F. A heat treatment of several hours duration is ordinarily required to effect the desired conversion of distillery slop when the converting temperature is limited to 240° F. or less. Typical distillery slops produced in the manufacture of rye whiskey require somewhat higher temperatures and/or somewhat longer periods of heat treatment to convert them to the desired condition of filterability than do the slops obtained in the manufacture of Bourbon whiskey.

Prior to the conception of the present invention, the process of application Serial No. 155,036, as practiced by the present applicants, like most procedures of the prior art involving the step of liming, was performed by employing a quantity of lime sufficient, or more than sufficient, to neutralize the slop passed to the filter press.

The present invention relates to an improvement in the liming procedure, as compared to that of the prior application of Charles R. Brown, Serial No. 155,036. In the practice of the present invention, instead of liming the converted slop to a sufficient extent to neutralize the slop, the amount of lime employed is substantially less than that required for neutralization. The invention rests upon the discovery that, if a sufficient quantity of lime is employed to precipitate the phytin contained in the slop from solution, the limed slop can be filtered with just as great facility as in the case in which a quantity of lime is employed representing a molecular equivalent or excess of the acid contained in the slop. A particular feature of the present invention relates to the recovery of the vegetable oil from the filter cake or equivalent fraction obtained by liming the filtered slop to the extent indicated above. By the practice of the liming step and the step of separation of an insolubles-containing fraction from the limed slop, particular advantages are obtained in the quality of vegetable oil produced, and the efficiency of obtaining such oil, when the limited liming step of the present invention is followed. The invention may be best understood by reference to the attached flow sheet, in which, Figure 1 represents the preferred sequence of steps employed in the practice of the process, and Figure 2 represents an alternative embodiment of the invention.

In the following discussion, we shall assume that the distillery slop under treatment is obtained as a by-product of the manufacture of alcohol from corn. It is to be understood that this method of approach is adopted merely for the sake of simplicity of description and the invention is applicable to the filtration and separate recovery of values from the constituents of distillery slops obtained by the fermentation of other grains containing vegetable oils.

In the practice of the invention, distillery slop obtained in the manufacture of Bourbon whiskey, for example, is preferably first passed through an eight-mesh screen 10 or equivalent screening medium to effect removal of large insoluble materials. This screening step may, however, be performed after the step of pressure conversion described hereinafter and before the step of settling, if desired. The slop is then passed to a pressure converter 11, which may be an ordinary autoclave or may be a continuous pressure heating apparatus through which the slop flows during the application of heat under pressure sufficient to keep the slop liquid. The slop is heated in the converter 11 for a sufficient period of time to render feasible its continuous filtration through cloth, this heating step being of the same character as that described above and in the co-pending application of Charles R. Brown referred to above. Lime or equivalent reagent from the container 12 is then added to the converted slop, and the limed slop is subjected to an operation of gravity, settling or centrifugal separation, as indicated at 13, to effect removal of the liquid which can be readily separated therefrom in such an apparatus. The slop from which liquid has been separated in the apparatus 13 is then passed to a filter 14 which continuously separates the slop into a clear filtrate and a filter cake containing the insoluble constituents of the slop, respectively.

The critical feature of the present invention consists in the nature of the liming operation performed upon the converted slop. Instead of being limed to a condition of substantial neutrality, the slop is only partially limed, the liming step being sufficient to effect precipitation of the major part of the phytin contained in the slop, but insufficient to effect complete neutralization of the slop. It has been found that the phytin is precipitated from the slop when the slop has been limed to a pH of approximately 4.6, and the invention may be best practiced by liming the slop to approximately that point. This pH is obtained when a quantity of lime has been added constituting approximately one-half of the lime required to neutralize the slop. The invention may be practiced, however, by liming the slop with between one-third and two-thirds of the quantity of liming agent required to neutralize the slop. Thus, material advantages are obtained by liming the slop to any point within the range between pH 4.0 and 6.0 and the invention includes broadly a liming procedure in which quantities of lime necessary to produce this pH, or quantities of lime such as described above, are used.

The solids which are obtained as a filter cake on the filter 14 are next washed with water and subjected to treatment for the recovery of vegetable oil therefrom. These solids are preferably passed to a drier 15 and the dried solids are then subjected to any conventional step for the recovery of vegetable oil therefrom. Thus, these solids may be passed to an oil expeller 16 which may be a press of any suitable type ordinarily employed in the vegetable oil industry.

By the performance of the steps described above a filter cake is obtained which contains a very large proportion of corn oil, e. g., 25%. The mechanical expression of oil from solids of this oil content is an economically desirable procedure.

In the above discussion, the separation of slop solids from the liquid content of the slop has been described as a filtering operation. It is to be understood that other methods of effecting this separation may be substituted for the filtering step, as the converting step, constituting the first and critical step of the process, conditions the slop for separation of insolubles from liquid by other means, such as centrifugal separation or settling, as well as filtration. The converting step renders subsequent separation by filtration or otherwise possible by causing an agglomeration of some of the dispersed particles which impede separation into larger particles. At the same time, other parts of the suspended solids are thrown into solution in the liquid. The materials which would otherwise preclude efficient separation are thus partly dissolved and partly agglomerated and the resulting slop can be filtered, centrifuged, settled, or screened through cloth to produce a solids fraction of high vegetable oil content.

While the operation of screening the slop to separate coarse insoluble impurities therefrom on the screen 10 has been described above as occurring before the step of pressure conversion, this step of screening may be performed after pressure conversion and before filtration, if desired. The insolubles removed from the filter press 14 may, instead of being subjected to a step of pressing to remove vegetable oil, be extracted by any suitable solvent or combination of solvents to remove their vegetable oil content.

While the step of screening to remove large insoluble impurities before or after the step of pressure conversion is desirable, this screening step is not critical to the performance of the invention, and may be entirely omitted if desired. The large insoluble impurities removed by the screening operation contain a relatively small proportion of vegetable oil, whereas the fine insolubles removed on filter 14 contain a high percentage of such oil as indicated by the figure of 25% given above. If the operator desires to reclaim the relatively small proportion of oil contained in the large insoluble impurities as well as the oil contained in the impurities removed on the filter 14 in the embodiment of the invention illustrated in Figure 1, this may be accomplished by omitting the screening step and obtaining the large insolubles together with the fine insolubles as a filter cake on the filter 14.

As a still further alternative in the practice of the invention, the step of recovering vegetable oil from the filter cake may be accomplished by solvent extraction instead of by pressing. Thus, the filter cake from the filter 14 may be extracted by means of any suitable solvent such as ether, acetone, tri-chlorethylene, or hexane to recover the vegetable oil which it contains.

Figure 2 of the drawings illustrates an alternative embodiment in which the screening step may be omitted, and in which the step of separating a clear liquid from the slop by gravity subsidence or centrifugation prior to filtration is omitted, and in which the filter cake is subjected to solvent extraction to recover its oil content, instead of having its oil mechanically expelled.

In the embodiment of Figure 2 of the drawings, the slop, which may be preliminarily screened or not in accordance with the desires of the operator, is first subjected to a pressure conversion step in the converter 20 similar to the conversion step discussed above in connection with the converter 11.

Lime from container 21 is thereafter added to the converted slop in the same proportion indicated above with respect to the embodiment of Figure 1 of the drawings. The lime is then mixed with the slop in the mixer 22, and the mixture is passed to the filter 23 which is similar to the filter 14 and effects the separation of the converted and limed slop into a clear filtrate and a filter cake containing a large proportion of vegetable oil respectively.

The filter cake from filter 23 is then washed with water, dried in the drier 24 and passed to a vessel 25. One of the solvents mentioned above is passed to the vessel 25 in sufficient proportion to extract the vegetable oil content of the dried filter cake. The suspension of solids in the solution of oil in the solvent is then passed through a filter 26 for removing insoluble constituents therefrom in the form of a filter cake. The filtrate from filter 26 is then passed to a still 27 for removal of the solvent and recovery of the oil separated from the slop solids by solvent extraction in the vessel 25.

The advantages attained by the practice of the invention will be evident from the above discussion with the following explanation. The step of liming the converted slop materially improves the rate of filtration, thereby rendering the step of filtration or other equivalent step for recovering an insolubles fraction containing vegetable oil more efficient than could be attained without the liming step. If the amount of lime employed is sufficient to entirely neutralize the slop, however, or is substantially greater than the amount necessary to convert the slop to a pH of 5.6, the lime combines with the fatty acids of the slop to produce lime soaps of these fatty acids which are soluble in the vegetable oil. The principal feature of the present invention consists in liming the slop to such a limited extent that these soaps do not form, or to such an extent that they are formed in very limited quantities. The presence of the lime salts of the fatty acids in the insolubles fraction obtained upon filtration of slop limed to a point in excess of that discussed above is particularly deleterious from the standpoint of vegetable oil recovery, for the removal of these soaps from the oil requires a separate and expensive step of acidification which can be entirely avoided by careful observance of the procedure of the present invention.

Modifications will be obvious to those skilled in the art, and we do not therefore desire to be limited except by the scope of the sub-joined claims.

We claim:

1. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and neutrality, separating an insolubles-containing fraction from the limed slop and recovering vegetable oil from said insolubles-containing fraction.

2. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop to a point between pH 4.6 and 6.0, separating an insolubles-containing fraction from the limed slop, and recovering vegetable oil from said insolubles-containing fraction.

3. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop to a point between pH 4.6 and 6.0, separating an insolubles-containing fraction from the limed slop, and recovering vegetable oil from said insolubles-containing fraction by mechanical pressing.

4. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop to a point between pH 4.6 and 6.0, separating an insolubles-containing fraction from the limed slop, and recovering vegetable oil from said insolubles-containing fraction by solvent extraction.

5. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and 6.0, separating by filtration an insolubles-containing fraction from the limed slop, and recovering vegetable oil from said insolubles-containing fraction.

6. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and 5.6, separating an insolubles-containing fraction from the limed slop, and recovering vegetable oil from said insolubles-containing fraction.

7. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop to a point between pH 4.6 and 5.6, separating an insolubles-containing fraction from the limed slop, and recovering vegetable oil from said insolubles-containing fraction.

8. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and 6.0, separating a clear liquid from said limed slop by subsidence, separating an insolubles-containing fraction from the limed slop from which said clear liquid has been separated, and recovering vegetable oil from said insolubles-containing fraction.

9. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and 6.0, separating by filtration a clear liquid from said limed slop by subsidence, separating an insolubles-containing fraction from the limed slop from which said clear liquid has been separated, and recovering vegetable oil from said insolubles-containing fraction.

10. The process of treating distillery slop containing vegetable oil which comprises heating said slop to a temperature in excess of 250° F. for a sufficient time to convert said slop into a condition in which its albuminous constituents are coagulated and said slop converted to a condition in which it can be filtered through cloth, but not for a period in excess of one and one-half hours, thereafter liming the converted slop until at least a substantial proportion of the phytin content thereof has been precipitated from solution and the slop has a pH between 4.0 and 6.0, separating an insolubles-containing fraction from the limed slop, and recovering vegetable oil from said insolubles-containing fraction, large insoluble impurities being separated from said slop by screening prior to the step of liming said slop.

CHARLES R. BROWN.
ASHTON T. SCOTT.